United States Patent
Jing et al.

(10) Patent No.: US 8,761,174 B2
(45) Date of Patent: Jun. 24, 2014

(54) QUALITY OF SERVICE TRAFFIC RECOGNITION AND PACKET CLASSIFICATION HOME MESH NETWORK

(75) Inventors: Xiangpeng Jing, San Diego, CA (US);
Anuj Bhatnagar, San Diego, CA (US);
Aixin Liu, San Diego, CA (US);
Abhishek Patil, San Diego, CA (US);
Djung N. Nguyen, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 583 days.

(21) Appl. No.: 12/402,450

(22) Filed: Mar. 11, 2009

(65) Prior Publication Data
US 2010/0232370 A1   Sep. 16, 2010

(51) Int. Cl.
*H04L 12/28*   (2006.01)
*H04L 29/06*   (2006.01)
*H04L 29/12*   (2006.01)

(52) U.S. Cl.
CPC ...... *H04L 29/0653* (2013.01); *H04L 29/06095* (2013.01); *H04L 61/2517* (2013.01)
USPC ..................................... 370/392; 370/395.31

(58) Field of Classification Search
CPC .................... H04L 29/0653; H04L 29/06095; H04L 29/3009; H04L 49/309; H04L 45/74; H04L 12/56; H04L 2012/56
USPC ............................................. 370/389–395.31
See application file for complete search history.

(56) References Cited

U.S. PATENT DOCUMENTS

| | | | |
|---|---|---|---|
| 5,453,977 A | 9/1995 | Flammer, III et al. | |
| 5,465,251 A | 11/1995 | Judd et al. | |
| 5,537,415 A | 7/1996 | Miller et al. | |
| 6,041,049 A | 3/2000 | Brady | |
| 6,178,172 B1 | 1/2001 | Rochberger | |
| 6,574,662 B2 | 6/2003 | Sugiyama et al. | |
| 6,591,299 B2 | 7/2003 | Riddle et al. | |
| 6,611,522 B1 | 8/2003 | Zheng et al. | |

(Continued)

FOREIGN PATENT DOCUMENTS

| | | |
|---|---|---|
| EP | 1657862 | 8/2007 |
| EP | 1503606 | 3/2008 |

(Continued)

OTHER PUBLICATIONS

"Quality of Service on Cisco Multiservices Switches", *Cisco Systems, Inc.*, http://www.cisco.com/en/US/products/hw/switches/ps1925/products_white_paper09186a00800887ae.shtml.

(Continued)

*Primary Examiner* — Ayaz Sheikh
*Assistant Examiner* — Mounir Moutaouakil
(74) *Attorney, Agent, or Firm* — Blakely, Sokoloff, Taylor & Zafman LLP

(57) ABSTRACT

An embodiment is a technique to perform network-based traffic recognition and packet classification. A port identifier in a transport layer header of a packet having a packet type associated with a priority level is extracted. The packet is transmitted from or to an application according to a network protocol in a multi-hop mesh network having a local node and a remote node. The packet is classified into the packet type using one of a pre-defined port list, a dynamic port table, and an application header of the application.

9 Claims, 14 Drawing Sheets

(56) References Cited

U.S. PATENT DOCUMENTS

| | | |
|---|---|---|
| 6,640,248 B1 | 10/2003 | Jorgensen |
| 6,674,760 B1 | 1/2004 | Walrand et al. |
| 6,728,208 B1 | 4/2004 | Puuskari |
| 7,027,394 B2 | 4/2006 | Gupta et al. |
| 7,027,411 B1 | 4/2006 | Pulsipher et al. |
| 7,027,414 B2 | 4/2006 | Walsh et al. |
| 7,061,925 B2 | 6/2006 | Joshi |
| 7,106,718 B2 | 9/2006 | Oyama et al. |
| 7,194,463 B2 | 3/2007 | Zhao et al. |
| 7,218,637 B1 | 5/2007 | Best et al. |
| 7,333,435 B2 | 2/2008 | Gerkis |
| 7,359,971 B2 | 4/2008 | Jorgensen |
| 7,379,447 B2 | 5/2008 | Dunagan et al. |
| 7,463,639 B1 | 12/2008 | Rekhter |
| 7,542,459 B2 | 6/2009 | Conner et al. |
| 7,583,664 B2 | 9/2009 | Ho et al. |
| 7,613,167 B2 | 11/2009 | Denney et al. |
| 7,675,882 B2 | 3/2010 | Mighani et al. |
| 7,680,139 B1 | 3/2010 | Jones et al. |
| 7,720,065 B2 | 5/2010 | Liu et al. |
| 7,782,835 B2 | 8/2010 | Gossain et al. |
| 7,817,609 B2 | 10/2010 | Law et al. |
| 7,885,220 B2 | 2/2011 | Kaidar |
| 7,974,297 B2 | 7/2011 | Jing et al. |
| 8,194,593 B2 | 6/2012 | Jing et al. |
| 8,223,786 B2 | 7/2012 | Jing et al. |
| 2002/0178282 A1 | 11/2002 | Mysore et al. |
| 2003/0041161 A1* | 2/2003 | Billings et al. ............... 709/231 |
| 2003/0179742 A1 | 9/2003 | Ogier et al. |
| 2004/0037278 A1* | 2/2004 | Wong et al. ................ 370/389 |
| 2004/0064512 A1 | 4/2004 | Arora et al. |
| 2004/0073694 A1* | 4/2004 | Frank et al. ................. 709/232 |
| 2004/0218580 A1 | 11/2004 | Bahl et al. |
| 2005/0055577 A1 | 3/2005 | Wesemann et al. |
| 2005/0086295 A1 | 4/2005 | Cunningham et al. |
| 2005/0135243 A1 | 6/2005 | Lee et al. |
| 2005/0249220 A1 | 11/2005 | Olsen et al. |
| 2006/0002311 A1 | 1/2006 | Iwanaga et al. |
| 2006/0013159 A2 | 1/2006 | Gurevich |
| 2006/0215556 A1 | 9/2006 | Wu et al. |
| 2006/0256737 A1 | 11/2006 | Choi et al. |
| 2006/0256742 A1 | 11/2006 | Lee et al. |
| 2006/0262789 A1 | 11/2006 | Peleg et al. |
| 2006/0268797 A1* | 11/2006 | Cheng et al. ................ 370/338 |
| 2006/0277330 A1 | 12/2006 | Diepstraten et al. |
| 2006/0280152 A1 | 12/2006 | Lee et al. |
| 2007/0041385 A1 | 2/2007 | Sali et al. |
| 2007/0047563 A1* | 3/2007 | Shvodian .................... 370/412 |
| 2007/0060168 A1 | 3/2007 | Benveniste |
| 2007/0109989 A1 | 5/2007 | Nakagawa et al. |
| 2007/0116027 A1 | 5/2007 | Ciavaglia et al. |
| 2007/0147241 A1 | 6/2007 | Wang et al. |
| 2007/0171844 A1 | 7/2007 | Loyd et al. |
| 2007/0195727 A1 | 8/2007 | Kinder et al. |
| 2007/0211736 A1* | 9/2007 | Sapek et al. ................. 370/401 |
| 2007/0280106 A1 | 12/2007 | Lund |
| 2008/0013514 A1 | 1/2008 | Lee et al. |
| 2008/0069059 A1 | 3/2008 | Yagyu et al. |
| 2008/0069065 A1 | 3/2008 | Wu et al. |
| 2008/0075010 A1 | 3/2008 | Song |
| 2008/0192753 A1 | 8/2008 | Li |
| 2008/0279216 A1 | 11/2008 | Sharif-Ahmadi et al. |
| 2009/0003232 A1 | 1/2009 | Vaswani et al. |
| 2009/0010205 A1 | 1/2009 | Pratt et al. |
| 2009/0022090 A1 | 1/2009 | Ayoub et al. |
| 2009/0028095 A1* | 1/2009 | Kish ........................... 370/328 |
| 2009/0028182 A1 | 1/2009 | Brooks et al. |
| 2009/0109846 A1 | 4/2009 | Sinha |
| 2009/0122712 A1 | 5/2009 | Sharif-Ahmadi et al. |
| 2009/0138966 A1 | 5/2009 | Krause et al. |
| 2009/0141732 A1 | 6/2009 | Woo et al. |
| 2010/0046395 A1 | 2/2010 | Sivaramakrishna et al. |
| 2010/0232354 A1 | 9/2010 | Patil et al. |
| 2010/0232369 A1 | 9/2010 | Jing et al. |
| 2010/0232370 A1 | 9/2010 | Jing et al. |
| 2010/0232371 A1 | 9/2010 | Jing et al. |
| 2010/0232396 A1 | 9/2010 | Jing et al. |
| 2010/0232400 A1 | 9/2010 | Patil et al. |
| 2010/0232447 A1 | 9/2010 | Jing et al. |

FOREIGN PATENT DOCUMENTS

| | | |
|---|---|---|
| WO | WO 0010357 | 2/2000 |
| WO | WO 2008007255 | 1/2008 |
| WO | WO 2008027005 | 3/2008 |

OTHER PUBLICATIONS

"MultiNet: Connecting to Multiple IEEE 802.11 Networks Using a Single Wireless Card", Chandra, Ranveer et al., http://www.cs.ucsd.edu/classes/sp07/cse291-d/presentations/chen.pdf, SP 2007.

"Connecting to Multiple IEEE 802.11 Networks with One WiFi Card", Microsoft, http://research.microsoft.com/netres/projects/virtualwifi, 2002.

"Providing End-to-End Quality of Service in CDMA2000 Networks", Zhao, Haibo et al., Mobile Technology, Applications and Systems, 2005 Second International Conference on, pp. 1-4, Nov. 15-17, 2005.

"802.11 TGs MAC Enhancement Proposal", Samusung, https://mentor.ieee.org/802.11/dcn/05/11-05-0589-00-000s-802-11-tgs-mac-enhancement-proposal-doc.doc; vol. IEEE 802.11-05/589r0; pp. 1-10, 2005.

"Distance-1 Constrained Channel Assignment in Single Radio Wireless Mesh Networks", Aryafar, Ehsan et al., http://ieeexplore.ieee.org/Xplore/log.jsp?url=/iel5/4509594/4509595/04509722.pdf?arnumber=4509722; pp. 762-770, 2008.

"Comparing the bandwidth and priority commands of a QoS service policy", Cisco, http://www.cisco.com/en/US/tech/tk543/tk757/technologies_tech_note09186a0080103eae.shtml, 2004.

Office Action for U.S. Appl. No. 12/402,439 dated Sep. 30, 201.
Office Action for U.S. Appl. No. 12/402,414 dated Nov. 20, 2013.
Office Action dated Aug. 28, 2013 for U.S. Appl. No. 12/402,433.
Office Action dated Jul. 1, 2013 for U.S. Appl. No. 12/402,414.

* cited by examiner

QUALITY OF SERVICE TRAFFIC RECOGNITION AND PACKET CLASSIFICATION HOME MESH NETWORK

TECHNICAL FIELD

The presently disclosed embodiments are directed to the field of wireless communication, and more specifically, to mesh network.

BACKGROUND

A wireless network can provide a flexible data communication system that can either replace or extend a wired network. Using radio frequency (RF) technology, wireless networks transmit and receive data over the air through walls, ceilings and even cement structures without wired cabling. For example, a wireless local area network (WLAN) provides all the features and benefits of traditional LAN technology, such as Ethernet and Token Ring, but without the limitations of being tethered together by a cable. This provides greater freedom and increased flexibility.

Currently, a wireless network operating in accordance with the Institute of Electrical and Electronic Engineers (IEEE) 802.11 Standard (e.g., IEEE Std. 802.11a/b/g/n) may be configured in one of two operating modes: infrastructure mode and ad hoc mode. One important aspect of wireless communication is Quality of Service (QoS). Traditional QoS techniques focus on single-hop network and are typically implemented on a single device (e.g., a router or a server) in the network. These techniques are not suitable for multiple hop distributed networks. In addition, existing QoS techniques typically do not discriminate different levels of media qualities such as high-definition (HD) and standard definition (SD) videos.

SUMMARY

One disclosed feature of the embodiments is a method and apparatus to perform network-based traffic recognition and packet classification. A port identifier in a transport layer header of a packet having a packet type associated with a priority level is extracted. The packet is transmitted from or to an application according to a network protocol in a multi-hop mesh network having a local node and a remote node. The packet is classified into the packet type using one of a pre-defined port list, a dynamic port table, and an application header of the application.

BRIEF DESCRIPTION OF THE DRAWINGS

Embodiments may best be understood by referring to the following description and accompanying drawings that are used to illustrate embodiments. In the drawings.

DETAILED DESCRIPTION

One disclosed feature of the embodiments is a technique to perform network-based traffic recognition and packet classification. The classifier monitors traffic from an application or to an application and analyzes the application network protocols to build a dynamic port table for classifying packet priorities. A port identifier in a transport layer header of a packet having a packet type associated with a priority level is extracted. The packet is transmitted from or to an application according to a network protocol in a multi-hop mesh network having a local node and a remote node. The packet is classified into the packet type using one of a pre-defined port list, a dynamic port table, and an application header of the application.

In the following description, numerous specific details are set forth. However, it is understood that embodiments may be practiced without these specific details. In other instances, well-known circuits, structures, and techniques have not been shown to avoid obscuring the understanding of this description.

One disclosed feature of the embodiments may be described as a process which is usually depicted as a flowchart, a flow diagram, a structure diagram, or a block diagram. Although a flowchart may describe the operations as a sequential process, many of the operations can be performed in parallel or concurrently. The beginning of a flowchart may be indicated by a START label. The end of a flowchart may be indicated by an END label. In addition, the order of the operations may be re-arranged. A process is terminated when its operations are completed. A process may correspond to a method, a program, a procedure, a method of manufacturing or fabrication, etc. One embodiment may be described by a schematic drawing depicting a physical structure. It is understood that the schematic drawing illustrates the basic concept and may not be scaled or depict the structure in exact proportions.

Figure 1:
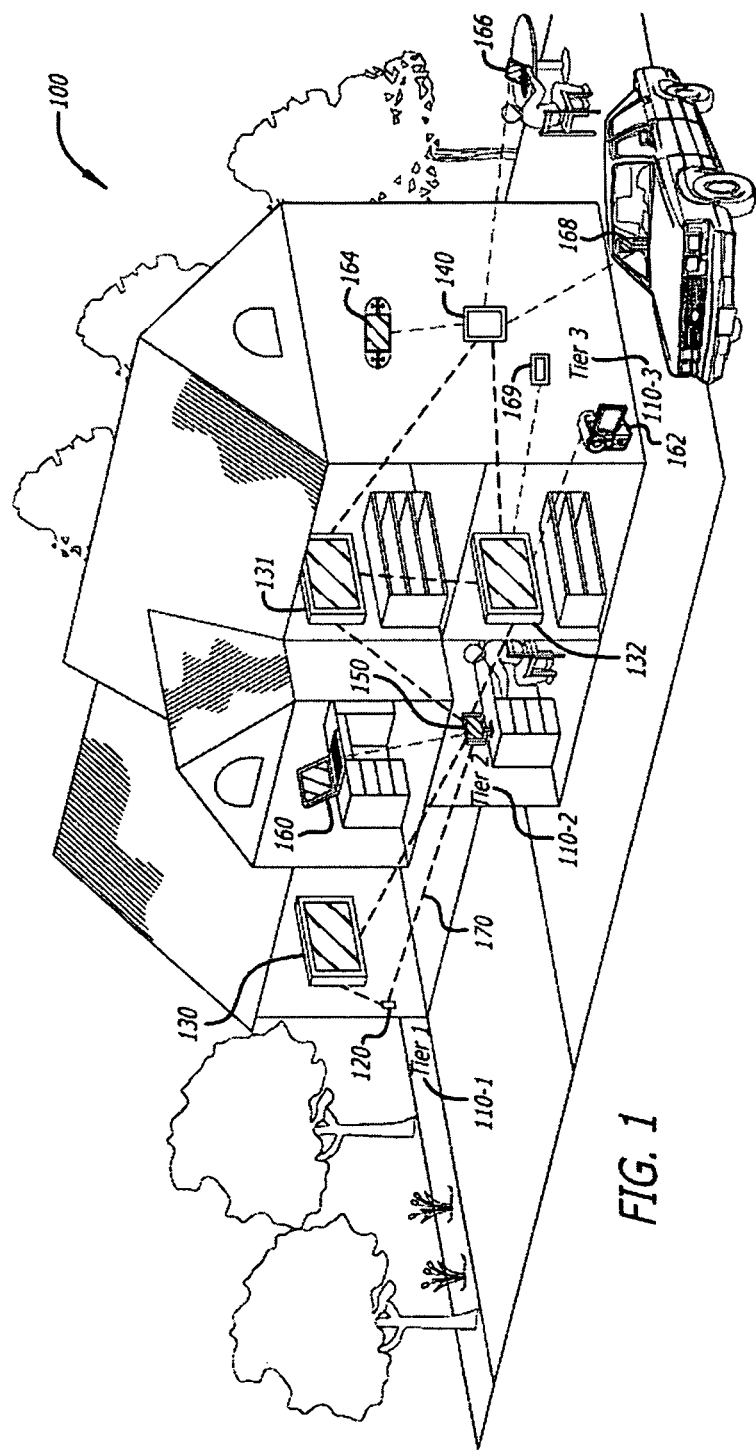
FIG. 1 is a diagram illustrating a system of a three-tier wireless ad hoc home mesh network (WHMN) according to one embodiment.

FIG. 1 is a diagram illustrating a system of a three-tier wireless ad hoc home mesh network (WHMN) according to one embodiment.

Multi-tier wireless home mesh network 100 (hereinafter referred to as "WHM network" or "WHMN" 100) comprises a collection of nodes that operate as a decentralized, wireless home mesh network with multiple (N≥1) sub-networks $110_1$-$110_N$ (hereinafter singularly referred to as "tiers") that are responsible for different functions within WHM network 100. Hence, mostly every node of WHM network 100 is configured to forward data to other nodes and is assigned to a specific tier based on its performance capabilities and power constraints. The assignment of a node to a tier is a decision based on performance capabilities of the node, whereas routing decisions are made by the nodes based on the network connectivity and the ability to forward data by that particular node.

For instance, one embodiment of WHM network 100 features a hierarchical architecture comprising three (3) tiers that are assigned based on the capabilities of the node. A first tier ("tier 1") $110_1$ is responsible for establishing and controlling access to an external network such as the Internet. For example, first tier $110_1$ may resemble a traditional Internet connection via a cable or direct subscriber line (DSL) connection or 3G/WiMax/Outdoor mesh. As illustrated, first tier $110_1$ comprises a first node 120, which is commonly referred to as a "gateway node." Gateway node 120 may include, but is not limited or restricted to a cable or DSL modem, a wireless router or bridge, and the like. Although not shown, multiple gateway nodes may be present within WHM network 100 in order to provide multiple communication paths to external network(s).

A second tier ("tier 2") $110_2$ of WHM network 100 may represent a wireless network backhaul that interconnects various stationary (fixed-location) wireless nodes such as stationary (fixed-location) electronics devices adapted for communicating over a wireless communication medium such as, for example, radio frequency (RF) waves. As described herein, an "electronic device" may be stationary or mobile. A "stationary electronics device" includes, but is not limited or restricted to: a flat-panel television (130, 131, and 132), a gaming console (140), desktop computer (150), or any other device that is usually stationary and is electrically coupled to an AC power outlet. Hence, stationary electronics devices are not subject to power constraints that are usually present in mobile nodes where power usage is minimized to extend battery life between recharges.

A third tier ("tier 3") $110_3$ of WHM network 100 may include links between a wireless node belonging to second tier $110_2$ and one or more mobile nodes (160, 162, 164, 166, 168 & 169). A "mobile node" may include any battery powered electronics device with wireless connectivity including, but is not limited to a laptop computer, handheld device (e.g., personal digital assistant, ultra mobile device, cellular phone, portable media player, wireless camera, remote control, etc.) or any non-stationary consumer electronics devices. Since mobile nodes normally have resource constraints (e.g., limited power supplies, limited processing speeds, limited memory, etc.), third tier $110_3$ may provide reduced network services. In one embodiment, mobile nodes of WHM network 100 may act as a slave or child connecting directly to a tier-2 node, which may further limit their functionality within WHM network 100.

Table 1 summarizes a multi-tier, wireless home mesh network architecture, categorization by potential network characteristics, tier node descriptions and traffic type that is prevalent over WHM network 100.

TABLE 1 multi-tier wireless home mesh network scenario

| | | Characteristics | Examples |
|---|---|---|---|
| Network | Dimension | ~50 × 60 sq ft; 1-2 stories or high-rising building | House Apartment building Business |
| | Node Number | Tier 2 - 3~10; Tier 3 - 5~20 | 2 TVs, 1 desktop computer, 1 PS3; 2 laptops, 4 mobile phones, 4 media players, . . . |
| | Distribution | Indoor, 3D, Non-LOS, link distance 15~60 ft | Uniformly distributed Tier-2 nodes, clustered Tier 3 |
| Node Type (per Tier Network) | Tier 1 | Usually one or two Tier 1 nodes | Cable/DSL modem, WiMax/3G, Outdoor Mesh |
| | Tier 2 | Fixed location, power-sufficient (TX power 100 mW-1 W) | TV, desktop computer, gaming console (e.g. PS3), etc. |
| | Tier 3 | Mobile, power-limited (TX power 1-100 mW) | Laptop, mobile phone, portable media player, wireless camera, remote |
| Traffic | HD video streaming | ~30 Mbps compressed | 1080p/i, 720p/i, 480p/i quality HD videos |
| | SD Video/ Audio streaming | ~100k-1 Mbps video, 32k-256 kbps audio | Internet video clip (e.g. YouTube ®), webcam output, mp3 audio, voice |
| | Data | Bursty transmission, ~20 Mbps for certain user satisfaction | http type data (web browsing) |

As indicated by Table 1, WHM network 100 is distinct from conventional mesh-network solutions because WHM network 100 is directed to consumer electronics (CE) devices and video-centric applications. Based on the traffic indicated in Table 1, which may include high-definition (HD) video, audio clips and video clips, as well as user data, wireless NICs may be incorporated within some of the stationary nodes of the WHM network 100. For example, by multiplexing one flow of compressed HD video, four Internet video sessions plus four audio/video sessions and some intermittent http data traffic, the load on the backhaul link 170 is approximately 60 megabits per second for TCP/UDP type traffic, which may require at least 100 megabits per second of raw radio support considering media access control (MAC) layer efficiency. According to this example, the tier 2 nodes might require an 802.11n type radio (e.g., at 5 GHz band) to meet such a bandwidth requirement.

The WHMN 100 represents a network in which a mesh backhaul including fixed nodes such as TVs, desktop computers and Play stations. There may be many high-bandwidth demanding applications and low-bandwidth applications. A QoS architecture is needed to provide service and support for mixed video, audio, and data applications.

Mesh QoS Design Architecture:

In one embodiment, the QoS design is based on the distinction among different types of traffic streams. The mesh network may be targeted to TV-centric home scenarios where fixed and mobile devices may be connected by the TV-based network architecture. The traffic streams may represent a variety of content formats or types. For example, the traffic streams going through the television may be video streams.

Within the video streams, there may be a number of different formats, such as high definition (HD) or standard definition (SD). Within the HD types, there may be different levels of resolution. For example, the HD may include 1080 progressive/interlaced (p/i), 720 p/i, 480 p/i. When the television is connected to a computer or data network (e.g., the Internet), the video streams for normal TV viewing may compete with other network-based traffic streams such as premium video content, small video clips, and Web data. These content streams may have different bandwidths, delays, types of services, and priority levels. A useful QoS design, therefore, aims at distinguishing the types of content streams so that appropriate services may be provided.

Figure 2:
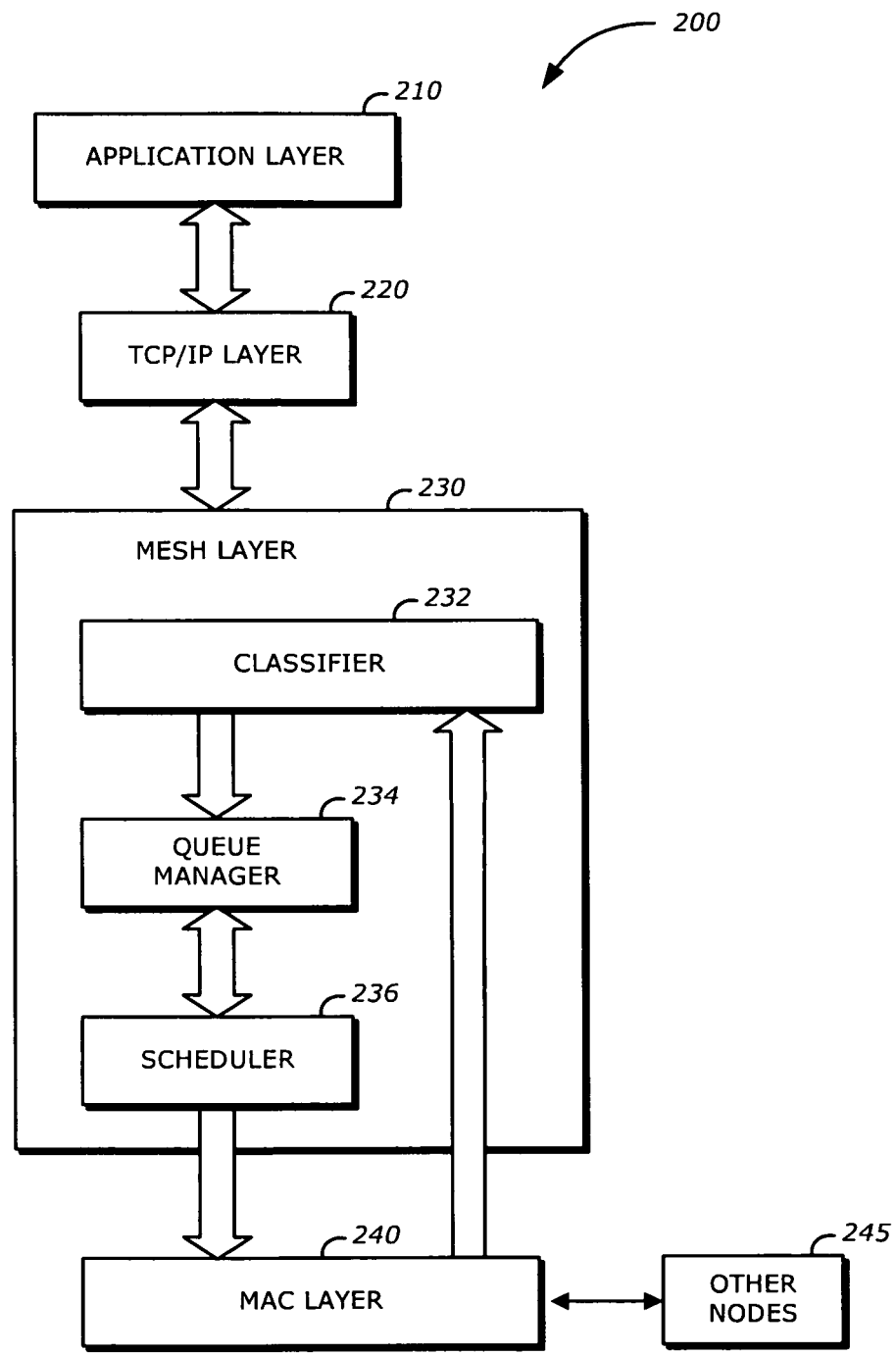
FIG. 2 is a diagram illustrating a mesh QoS architecture according to one embodiment.

FIG. 2 is a diagram illustrating a mesh QoS architecture 200 in a local node according to one embodiment. The mesh QoS architecture 200 includes an application layer 210, a Transmission Control Protocol/Internet Protocol (TCP/IP) layer 220, a mesh layer 230, and a MAC layer 240. Note that the mesh QoS architecture 200 may include more or less than the above components. The mesh QoS architecture 200 improves the QoS by intelligently differentiating packets into different traffic and/or content categories. Based on the information, all packets arriving from the higher layer are classified into packet types according to the packet traffic and content. A priority level is then given to a packet based on its packet type. Packets are then distributed according to their priority level and load condition. The mesh QoS architecture 200 provides an optimized packet management at mesh driver layer to give priorities to different traffics, handle multi-hop network traffic, and differentiate different quality levels of the streaming contents.

The application layer 210, the TCP/IP layer 220 and the MAC layer 240 are the typical layers in a network. The application layer 210 may include the application programs running at the local node. Packets may be transferred from the application layer 210 to the mesh layer 230 via the TCP/IP layer 220. The MAC layer 240 may have connectivity with other nodes in the network. It may also receive packets from other nodes which are then pushed up to the mesh layer 230 to be processed. The applications that may be supported in the mesh QoS architecture 200 may be any suitable applications. In one embodiment, these applications may include the File Transfer Protocol (FTP), Digital Living Network Alliance (DLNA) supporting HyperText Transfer Protocol (HTTP) and Real-Time Streaming Protocol (RTSP), Server Message Block (SMB, or Samba), Network File System (NFS), Remote Procedure Call (RPC), Voice over IP (VoIP), HTTP, etc.

The mesh layer 230 interfaces between the TCP/IP layer 220 and the MAC layer 240. It may receive packets from the application layer 210 via the TCP/IP layer 220 and send/transmit the packets within the local node in a local traffic. It may receive packets from the MAC layer 240 from other nodes 245 and forward the packets to one of the other nodes 245 in a forwarding traffic. The mesh layer 230 may include a traffic recognition and packet classifier 232, a queue manager 234, and a scheduler 236. The mesh layer 230 may include more or less than the above components. Any of these components may be implemented by hardware, software, firmware, or any combination thereof. The classifier 232, the queue manager 234, and the scheduler 236 are independent from one another. They may operate sequentially, parallel, or in an overlapping manner (e.g., pipelining)

The classifier 232 classifies or identifies the packets based on the applications and/or the type of traffic into a plurality of packet types having different priority levels. The classifier 232 may perform the classification by examining the port identifiers, the source and destination nodes, and the application that sends or receives the packet. It may classify a packet into a packet type. The packet type may be related to the traffic type such as local traffic or forwarding traffic. Under this classification, a packet type may be a local type (for local traffic) or a forwarding type (for forwarding traffic). The packet type may also be related to the content of the packet or the application that transmits or receives the packet. Under this classification, a packet may be a control packet, a voice/audio packet, a high-quality video packet, a low-quality video packet, and a background packet. A control packet is a packet that is used for control functions such as mesh discovery, routing, etc. A voice/audio packet is a packet that is used for voice and/or audio such as Voice over IP (VoIP). A high-quality packet is a packet used for high-quality video streams such as high definition (HD) or high-resolution video, such as 1080 progressive/interlaced (P/I), 720 P/I, and 480 P/I. A low-quality packet is a packet used for low-quality video streams such as standard definition (SD) video or lower resolution video. A background packet is a packet used for background traffic such as meta data, web traffic, etc. Under this classification, a packet type may be a control type, a voice/audio type, a high-quality video type, a low-quality video type, and a background type, corresponding to the control packet, the voice/audio packet, the high-quality video packet, the low-quality video packet, and the background packet, respectively.

The classification may combine both the traffic type and the content type. In one embodiment, the traffic type includes two types: local type and forwarding type. The content type includes five types: the control type, the voice/audio type, the high-quality video type, the low-quality video type, and the background type. Accordingly, a packet may be any one of the ten packet types. It is contemplated that the number of classification types may be more or less than the above types depending on the characteristics of the network, the network traffic, the applications, and the contents.

The queue manager 234 performs queue management for mesh QoS in the WHMN. The queue manager 234 manages the outbound packets that are received from the TCP/IP layer 220 or the inbound packets (for self or forwarding) from the MAC layer 240. The queue manager 234 maintain a number of buffers, or queues, tailored according to the packet types as classified by the classifier 232. Each of the buffers may be tagged with a priority level based on the packet type. The queue manager 234 processes the packets according to the priority level using a scheduling policy as provided by the scheduler 236.

The scheduler 236 schedules processing the buffers storing the packets. It may schedule distributing the queued packets from the plurality of packet queues based on the priority levels according to a scheduling policy. It may determine when the packets in the buffers are retrieved and sent to the destination nodes. In one embodiment, the scheduler uses a priority-based weighted round-robin scheduling policy to go through, or visit, the buffers. In general, the priority-based weighted round-robin scheduling policy starts with the buffer having the highest priority level and then goes through the buffers according to the priority level until it reaches the buffer having the lowest priority level. After it processes the lowest priority buffer, it returns back to the highest priority buffer and continues the process. The scheduler 236 provides the queue manager 234 with information to retrieve the packets from the buffers. This information may include which buffer is to be retrieved and the number of packets to be retrieved from a buffer. In general, the higher priority a buffer has, the more packets are retrieved from that buffer. The amount of packets to be retrieved for distribution depends on the load condition of the buffer and is dynamically calculated. This calculation may be based on the network traffic and the size of the buffer. To prevent buffer stalling or starvation, the scheduler 236 employs a starvation prevention policy to allow low priority buffers receive service.

Figure 3:
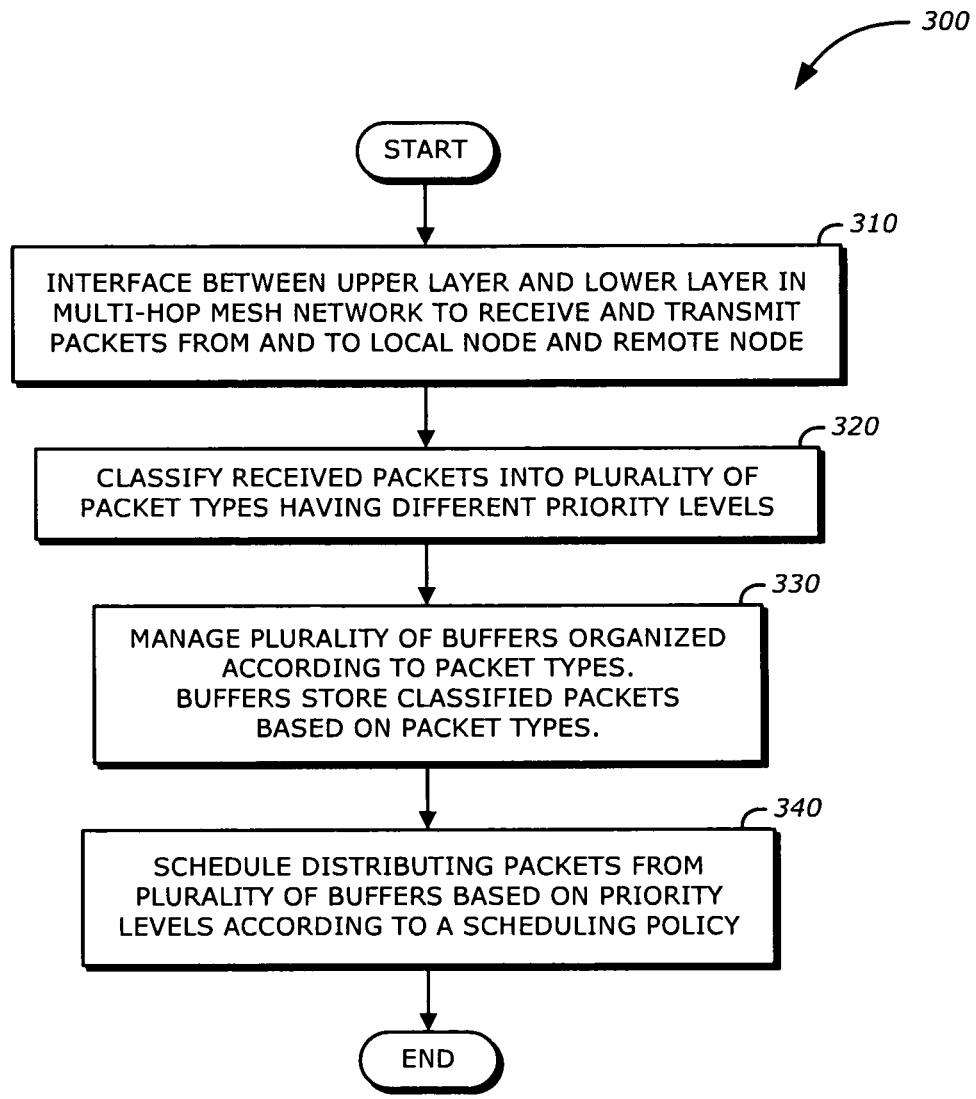
FIG. 3 is a flowchart illustrating a process to provide a QoS for the mesh network according to one embodiment.

FIG. 3 is a flowchart illustrating a process 300 to provide a QoS for the mesh network according to one embodiment.

Upon START, the process 300 interfaces between an upper layer and a lower layer in a multi-hop mesh network to receive and transmit packets from and to a local node and a remote node (Block 310). The upper layer may be the application layer 210 or the TCP/IP layer 220 shown in FIG. 2.

Next, the process 300 classifies the received packets into a plurality of packet types having different priority levels (Block 320). Then, the process 300 manages a plurality of buffers organized according to the packet types (Block 330). The plurality of buffers stores the classified packets based on the packet types. Then, the process 300 schedules distributing the packets from the plurality of buffers based on the priority levels according to a scheduling policy (Block 340). The process 300 is then terminated.

Figure 4:
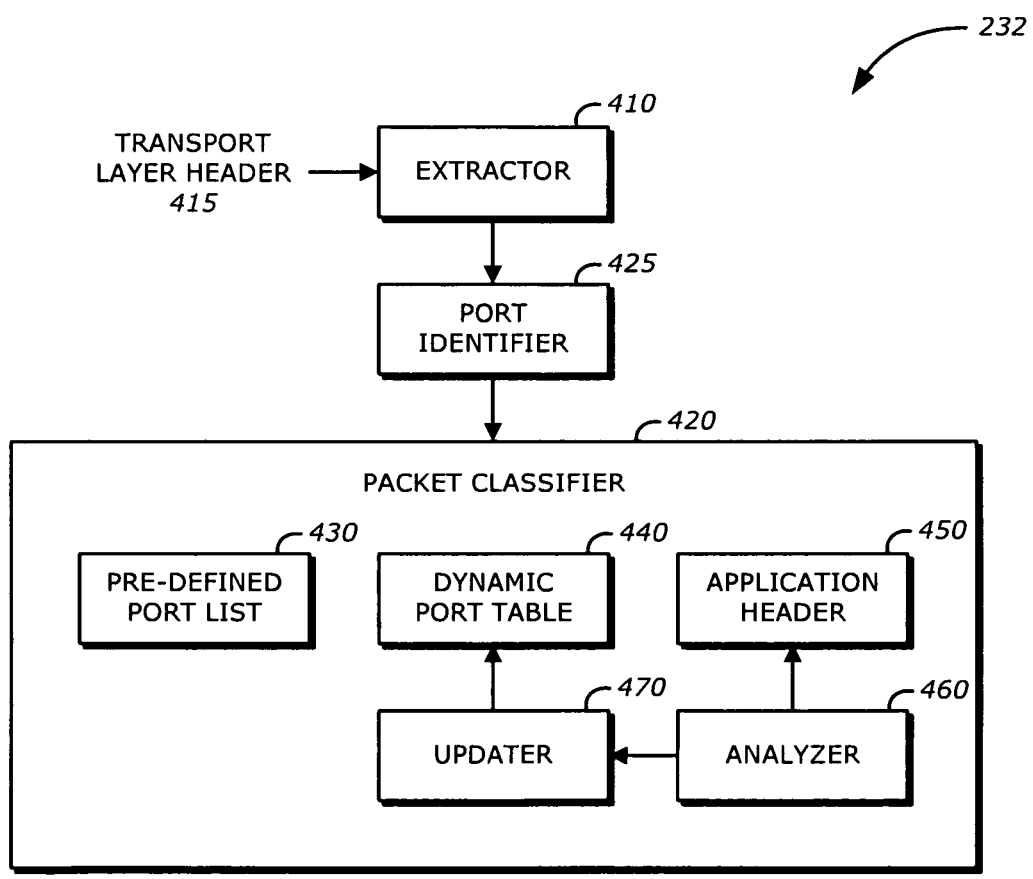
FIG. 4 is a diagram illustrating a classifier according to one embodiment.

Traffic Recognition and Packet Classifier:

FIG. 4 is a diagram illustrating the traffic recognition and packet classifier 232 shown in FIG. 2 according to one embodiment. The classifier 232 includes an extractor 410 and a packet classifier 420. The classifier 232 may include more or less than the above components.

The extractor 410 extracts a port identifier 425 in a transport layer header 415 of a packet having a packet type associated with a priority level. The packet is transmitted from an application according to a network protocol in a multi-hop mesh network having a local node and a remote node as described above. In the mesh network, the network-based applications follow certain pre-defined protocols (e.g., DLNA, Samba, NFS) which use common Transmission Control Protocol (TCP) or User Datagram Protocol (UDP) ports for control set-up and negotiation of ports used for transmission of actual data packets. The transport layer header 415 contains the port identifier 425 for traffic recognition which identifies the port associated with the data packet being transmitted. The port identifier 425 may include a port number, the IP address that the port is associated with, and the communication protocol. The port identifier 425 may identify one of or both of the source and destination ports for the application.

The packet classifier 420 includes a pre-defined port list 430, a dynamic port table 440, an application header 450, an analyzer 460, and an updater 470. The packet classifier 420 classifies the packet into the packet type using one of the pre-defined port list 430, the dynamic port table 440, and the application header 450 of the application. The pre-defined port list 430 is a list of the port identifiers of the ports that have been pre-defined or designated for specific applications. The port identifier may be a port number or a port label. Therefore, once the port identifier is known to be in the pre-defined port list 430, the type of application or packet using the port identifier is known immediately. The packet classifier 420 then classifies the packet into this known packet type. If the port identifier 425 is not in the pre-defined port list 430, then the dynamic port table 440 is used next. The dynamic port table 440 contains the list of the port identifiers and their associated packet types, application types, or priority levels as previously discovered or detected for the currently active sessions. The traffic recognition and packet classifier 232 analyzes packets coming from both the upper layer (e.g., the IP layer 220 shown in FIG. 2) and lower layer (e.g., the MAC layer 240 shown in FIG. 2). The control packets for common multimedia applications used for port negotiation are usually two-way communication and thus can be analyzed by the classifier 232 for maintaining the dynamic port table 440. The dynamic port table 440 is constantly updated and dynamically changed to reflect the current status of the use of the ports for packet transmission. The dynamic port table 440 is then searched to determine if it contains the extracted port identifier 425. If it does, then the packet type, application type, or priority level associated with the port identifier 425 is retrieved from the dynamic port table 440 and the packet classifier 420 classifies the packet into the corresponding packet type in the dynamic port table 440. If, however, the dynamic port table 440 does not contain the extracted port identifier 425, then it means that the packet type or the application type has not yet been identified. To identify the packet type or the application type, the analyzer 460 analyzes the application header 450 of the application of the packet. This may be done by recognizing the application type and extracting the dynamic data port information. For example, this may be done by opening the application packet and identify the session type based on the application header 450. For example, the HTTP and SSDP control packets for the DLNA may be captured to identify the DLNA streaming type. Once the packet type has been identified, the updater 470 updates the dynamic port table 440 to include the extracted port identifier 425 together with the detected or identified packet type or application type. Any other port identifier that matches the port identifier 425 will now be associated with the newly detected or identified packet type or application type. The updater 470 may also remove a port identifier in the dynamic port table 440 if the application that uses it is no longer transmitted through the network or when the connection of the application session is closed.

Figure 5:
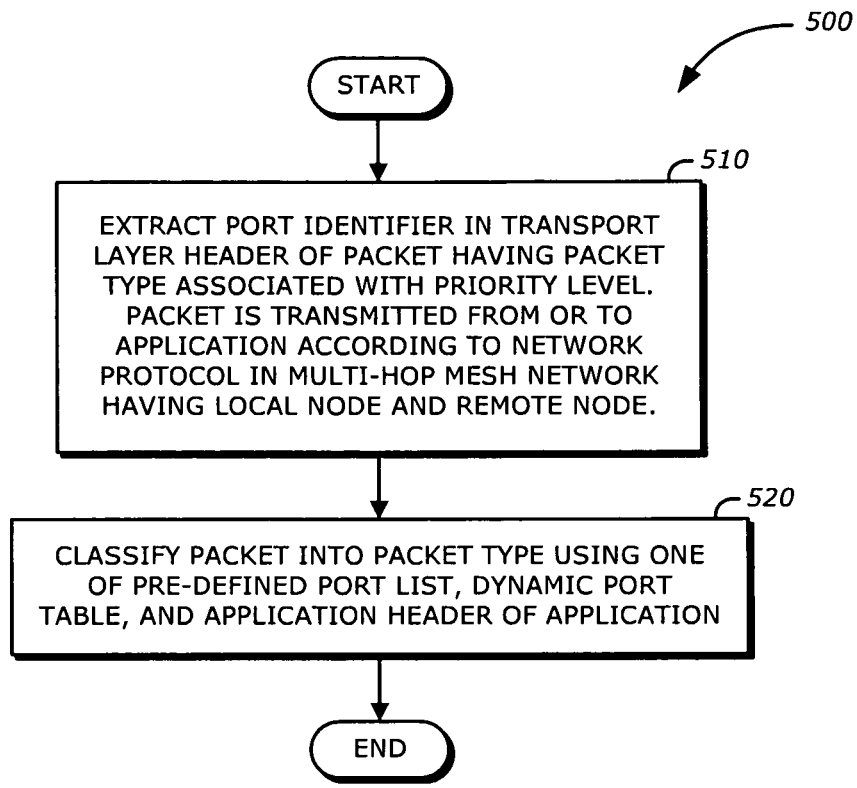
FIG. 5 is a flowchart to illustrate a process to classify a packet according to one embodiment.

FIG. 5 is a flowchart to illustrate a process 500 to classify a packet according to one embodiment.

Upon START, the process 500 extracts a port identifier in a transport layer header of a packet having a packet type associated with a priority level (Block 510). The port identifier may be a port number or a port label. The packet is transmitted from or to an application according to a network protocol in a multi-hop mesh network having a local node and a remote node.

Next, the process 500 classifies the packet into the packet type using one of a pre-defined port list, a dynamic port table, and an application header of the application (Block 520). The process 500 is then terminated.

Figure 6:
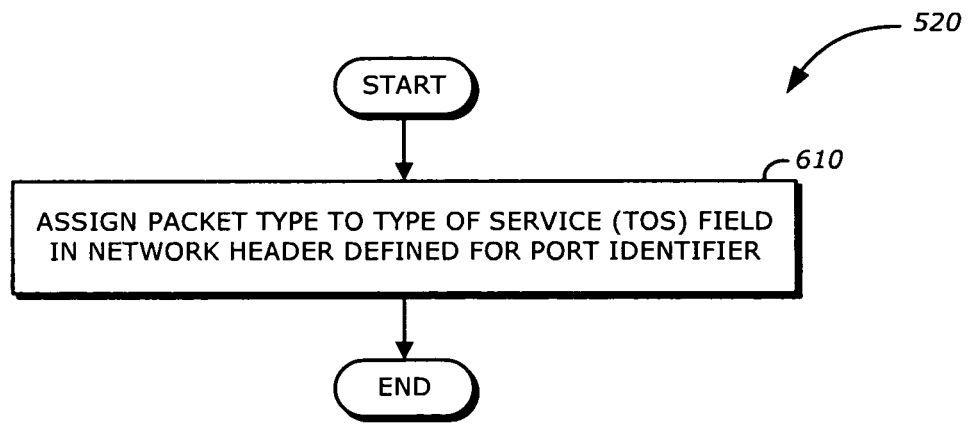
FIG. 6 is a flowchart to illustrate a process to classify a packet according to one embodiment.

FIG. 6 is a flowchart to illustrate the process 520 shown in FIG. 5 to classify a packet according to one embodiment. Note that the process 520 shown in FIG. 6 may follow the process 520 shown in FIG. 7.

Upon START, the process 520 assigns the packet type to a type of service (TOS) field in a network header such as the IP header defined for the port identifier (Block 610) and is then terminated. Since the TOS field in the IP header may be recognized by any IP QoS mechanism, the integrity of the packet classification is maintained throughout the life of the packet in the network. For example, if the packet is forwarded to a gateway that is outside the mesh, non-mesh routers may still recognize the classification and may assign priority level to the packet to maintain consistent QoS service. Furthermore, inside the mesh network, packets may be forwarded via multiple hops, the mesh header may change but the IP header containing the TOS field remains unchanged. Therefore, consistent QoS service may be guaranteed beyond one hop. As is known by one skilled in the art, if it is not desired to maintain consistent QoS beyond the mesh network, then the classification may be recorded in a mesh header.

Figure 7:
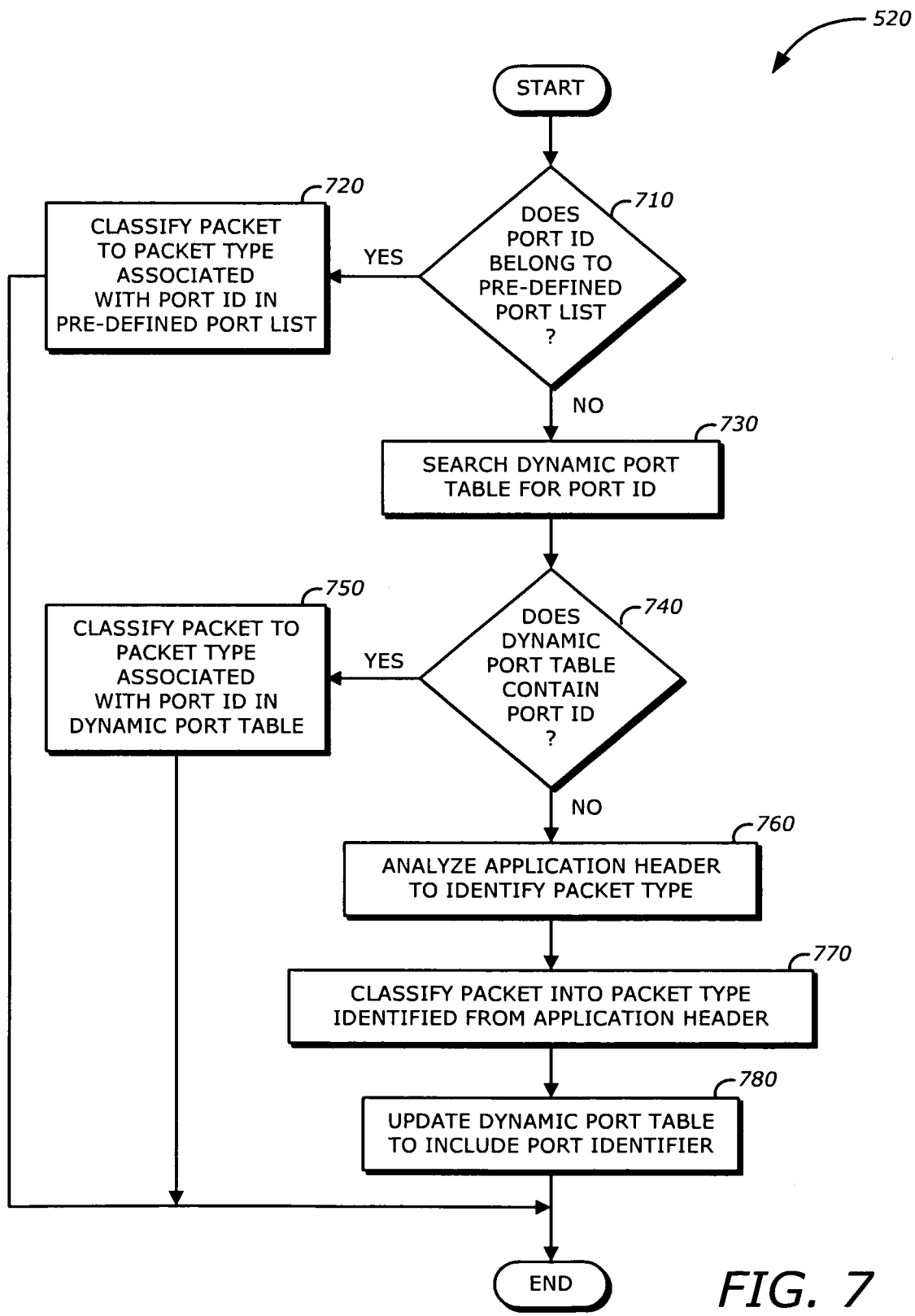
FIG. 7 is a flowchart to illustrate a process to classify a packet according to one embodiment.

FIG. 7 is a flowchart to illustrate the process 520 shown in FIG. 5 to classify a packet according to one embodiment.

Upon START, the process 520 determines if the port identifier belongs to a pre-defined port list (Block 710). If so, the process 520 classifies the packet to the packet type associated with the port identifier in the pre-defined port list (Block 720) and is then terminated. Otherwise, the process 520 searches the dynamic port table for the port identifier (Block 730). Then, the process 520 determines if the dynamic port table contains the port identifier (Block 740). If so, the process 520 classifies the packet into the packet type associated with the port identifier in the dynamic port table (Block 750) and is then terminated. Otherwise, the process 520 analyzes the application header to identify the packet type (Block 760). This may be done by recognizing the application type and extracting the dynamic data port information. Then, the process 520 classifies the packet into the packet type identified from the application header (Block 770). Next, the process 520 updates the dynamic port table to include the port identifier (Block 780) and is then terminated. Note that the process 520 shown in FIG. 7 may be followed by the process 520 shown in FIG. 6.

Figure 8:
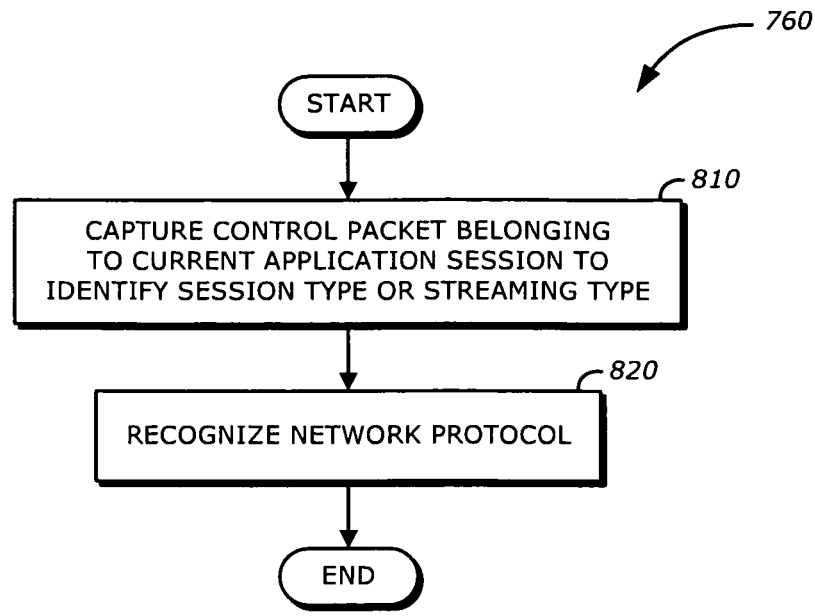
FIG. 8 is a flowchart to illustrate a process to analyze the application header according to one embodiment.

FIG. 8 is a flowchart to illustrate the process 760 shown in FIG. 7 to analyze the application header according to one embodiment.

Upon START, the process 760 captures a control packet belonging to a current application session to identify a session type or a streaming type (Block 810). Next, the process 760 recognizes the network protocol (Block 820). The recognized network protocol may be one of a File Transfer Protocol (FTP), a Digital Living Network Alliance (DLNA) protocol, a HyperText Transfer Protocol (HTTP), a Real-Time Streaming Protocol (RTSP), a Server Message Block (SMB, or Samba) protocol, a Network File System (NFS) protocol, a Remote Procedure Call (RPC) protocol, and a Voice over IP (VoIP) protocol. In addition, the file types may also be recognized. For example, the file types transferred by DLNA application may include mpg, mpeg, mp4, avi, wmv, mov, wma, mp3, jpg, xml, etc. The process 760 is then terminated.

Figure 9:
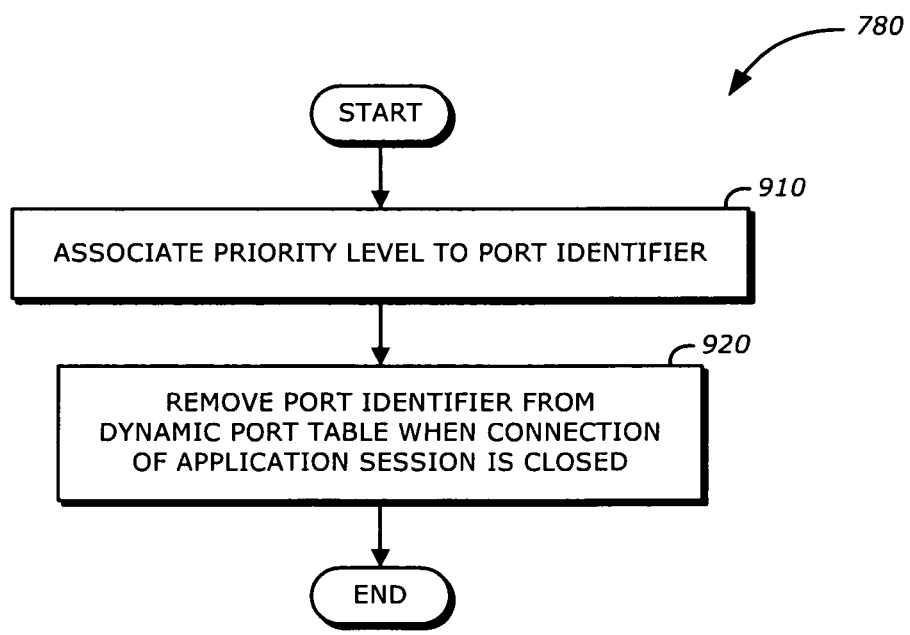
FIG. 9 is a flowchart to illustrate a process to update the dynamic port table according to one embodiment.

FIG. 9 is a flowchart to illustrate the process 780 shown in FIG. 7 to update the dynamic port table according to one embodiment.

Upon START, the process 780 associates the priority level to the port identifier (Block 910). By virtue of this association, any other port identifiers that match the combination of this port identifier have the same priority level. Next, the process 780 removes the port identifier from the dynamic port table when a connection of the application session is closed (Block 920). The process 780 is then terminated.

Figure 10:
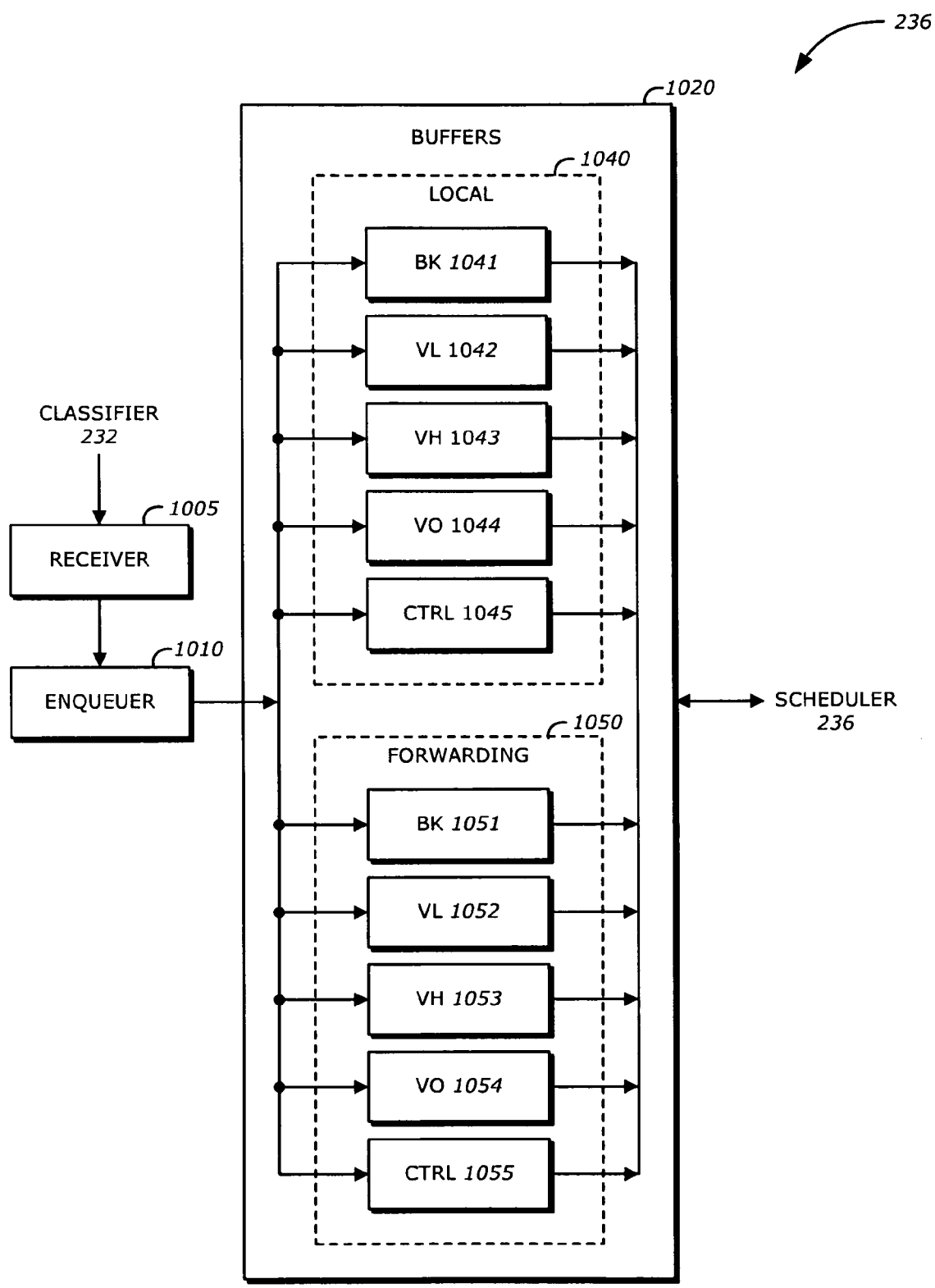
FIG. 10 is a diagram illustrating a queue manager according to one embodiment.

Queue Manager:

FIG. 10 is a diagram illustrating the queue manager 234 shown in FIG. 2 according to one embodiment. The queue manager 234 includes a receiver 1005, an enqueuer 1010, and a plurality of buffers 1020. The queue manager 234 may include more or less than the above components.

The receiver 1005 receives a packet from an upper layer (e.g., the TCP/IP layer 220 shown in FIG. 2) or a lower layer (e.g., the MAC layer 240 shown in FIG. 2) in a multi-hop mesh network. The packet has a packet type classified by the classifier 232 (FIG. 2). The receiver 1005 may be an interface to the classifier 232. It may be a buffer, a data steering circuit, or any structure or module that passes the classified packet to the enqueuer 1010. The enqueuer 1010 enqueues, deposits, or writes the received packet into one of the plurality of buffers 320 using the classification made by the classifier 232. For example, the enqueuer 1010 may read the TOS field of the corresponding IP header.

The buffers 1020 are organized according to the packet type or the packet priority level. The buffers 1020 include N buffers, or queues, that correspond to N different packet types. It is contemplated that the number of buffers depends on the number of different packet types as classified by the classifier 232 (FIG. 2). In one embodiment, the total number of packet types is ten including the traffic type and the content type. The buffers 1020 include a local (LCL) buffer 1040 and a forwarding (FWD) buffer 1050 corresponding to the local type and the forwarding type, respectively. When the content type is combined with the traffic type, each of the local buffer 1040 and forwarding buffer 1050 includes five buffers for five different content types. They are a control (CTRL) buffer, a voice/audio (VO) buffer, a high-quality video (VH) buffer, a low-quality video (VL) buffer, and a background (BK) buffer corresponding to the control type, the voice/audio type, the high-quality video type, the low-quality video type, and the background type, respectively. The local buffer 1040 includes a BK buffer 1041, a VL buffer 1042, a VH buffer 1043, a VO buffer 1044, and a CTRL buffer 1045. Similarly, the forwarding buffer 1050 includes a BK buffer 1051, a VL buffer 1052, a VH buffer 1053, a VO buffer 1054, and a CTRL buffer 1055.

Each of the buffers 1020 is given a priority level and a weight value according to its type. The priority level indicates the order in which the scheduler 236 goes through the buffers 1020 in a variable round-robin manner. The weight value provides a quantitative measure of the amount of packets to be retrieved from each buffer. In general, the higher priority level, the more packets are retrieved from the buffer. In general, the forwarding type have the priority level higher than the local type and the priority level decreases in order from the control type to the voice/audio type, the high-quality video type, the low-quality video type, and the background typee. Accordingly, the CTRL buffer has the highest priority, followed by the VO buffer, the VH buffer, the VL buffer, and the BK buffer in that order. For the same content type, the forwarding buffer 1050 has a higher priority than the local buffer 1040. For example, the CTRL buffer 1055 has a highest priority level. The VO buffer 1054 has a higher priority level than the VO 1044 and the VH 1053. The VO buffer 1044 in the local buffer 1040 has a higher priority level than the VH 1053 in the forwarding buffer 1050. Table 2 shows the priority level and the weight values for the buffers 1020.

TABLE 2

Priority level and weight values for the buffers 1020 shown in FIG. 10

| Buffer | Traffic Type | Buffer name | Priority Level | Weight |
|---|---|---|---|---|
| Q[LCL][BK] | Local | BK 341 | 0 | $W_1$ |
| Q[LCL][VL] | Local | VL 342 | 2 | $W_2$ |
| Q[LCL][VH] | Local | VH 343 | 4 | $W_3$ |
| Q[LCL][VO] | Local | VO 344 | 6 | $W_4$ |
| Q[LCL][CTRL] | Local | CTRL 345 | 8 | $W_5$ |
| Q[FWD][BK] | Forwarding | BK 351 | 1 | $W_6$ |
| Q[FWD][VL] | Forwarding | VL 352 | 3 | $W_7$ |
| Q[FWD][VH] | Forwarding | VH 353 | 5 | $W_8$ |
| Q[FWD][VO] | Forwarding | VO 354 | 7 | $W_9$ |
| Q[FWD][CTRL] | Forwarding | CTRL 355 | 9 | $W_{10}$ |

In Table 2, the higher the value of the priority level, the higher the priority is. The weight values $W_i$'s represent the number of packets to be retrieved for the buffers. The exact number depends on the load condition of each buffer as dynamically calculated by the scheduler 236 (FIG. 2). In one embodiment, the control buffers (e.g., CTRL 1055 and 1045) are emptied first before going to the data buffers (e.g., VO 1054, VH 1053, VO 1044, VH 1043, etc.). The data buffers are those buffers associated with the content type. Within the data buffers, those having higher priority level have higher weight values.

The buffers 1020 may be implemented in any suitable methods. In one embodiment, they are implemented as circular static arrays for efficiency and delay reduction. The size of each buffer is large enough to handle the most demanding scenarios. It may range from a few kilobytes (KBs) to several megabytes (MBs). However, there may be extreme conditions, or exceptions, where the number of packets exceeds the buffer capacity. In these rare circumstances, the packets may be dropped or become lost.

By discriminating different types of traffic and different types of streaming contents such as HD and SD, the queue manager 234 provides an efficient and enhanced QoS for mixed applications. The queue manager 234 processes the packets based on their priority level assigned according to their type. In addition, the queue manager 234 is designed to work with multiple hop distributed networks. It also works independently of existing QoS features at the application layer 210 or the MAC layer 240. It does not interfere with existing classification mechanism such as the classification using the Type of Service (TOS) bit in the IP packet. It provides exception handling when buffer capacity is exceeded. It uses circular static arrays for fast processing time to reduce packet delays. It prevents starvation for low priority packets.

Figure 11:
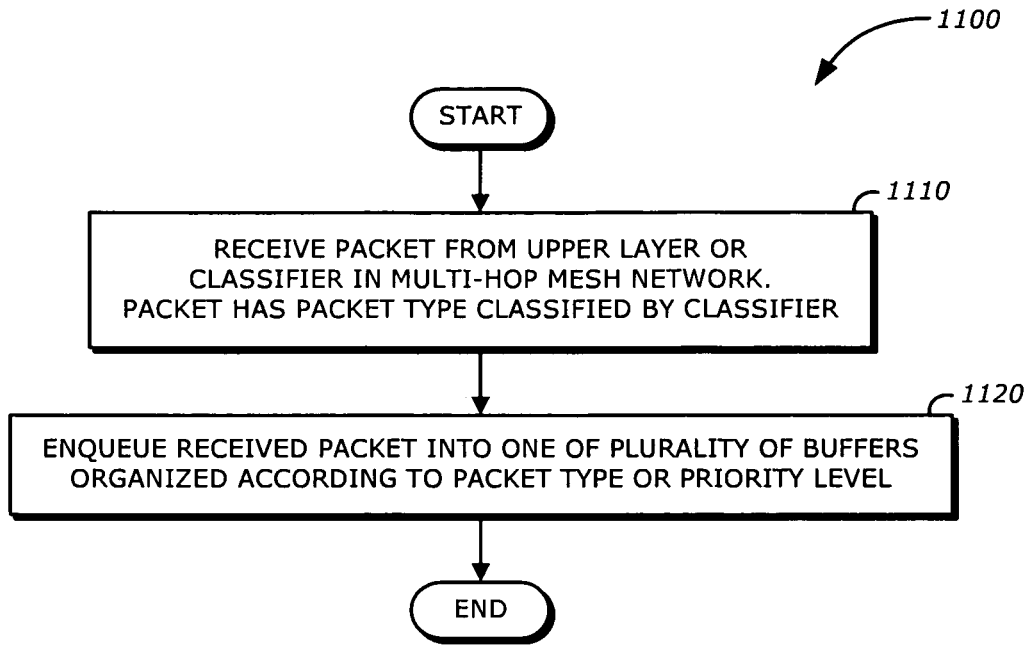
FIG. 11 is a flowchart illustrating a process to perform queue management according to one embodiment.

FIG. 11 is a flowchart illustrating a process 1100 to perform queue management according to one embodiment.

Upon START, the process 1100 receives a packet from an upper layer or a lower layer in a multi-hop mesh network (Block 1110). The packet has a packet type classified by a classifier such as the classifier 232 (FIG. 2). Next, the process 1100 enqueues the received packet into one of a plurality of buffers organized according to the packet type (Block 1120) such as shown in FIG. 3. The process 1100 is then terminated.

Figure 12:
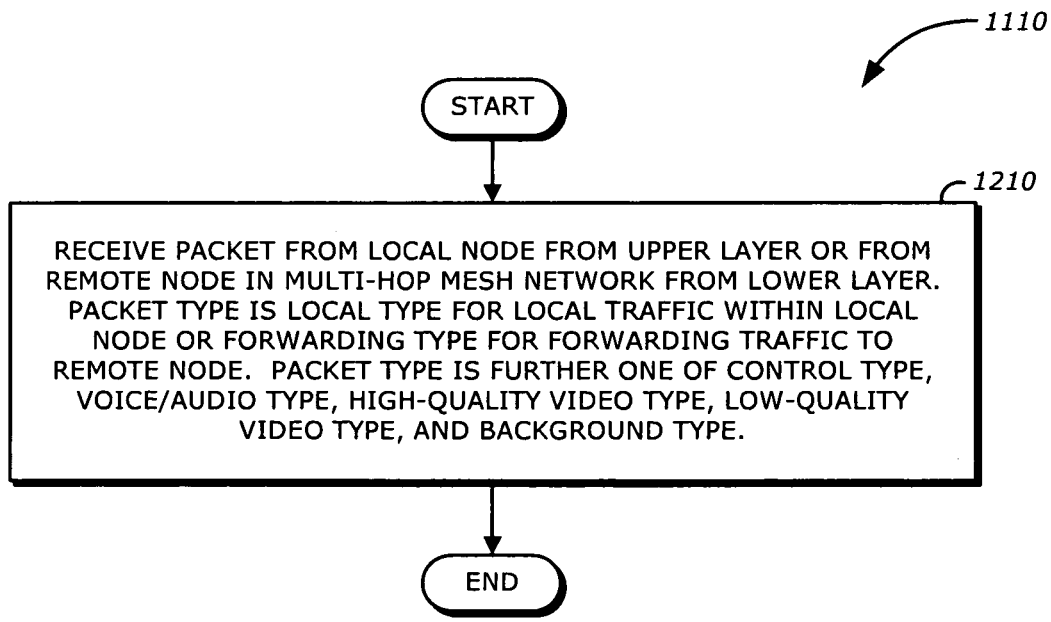
FIG. 12 is a flowchart illustrating a process to receive according to one embodiment.

FIG. 12 is a flowchart illustrating the process 1110 shown in FIG. 11 to receive according to one embodiment.

Upon START, the process 1110 receives the packet from a local node from the upper layer or from a remote node in the multi-hop mesh network from the lower layer (Block 1210). The packet type may be a local type for local traffic within the local node or a forwarding type for forwarding traffic to the remote node. The packet type may be further one of a control type, a voice/audio type, a high-quality video type, a low-quality video type, and a background type. The process 1110 is then terminated.

Figure 13:
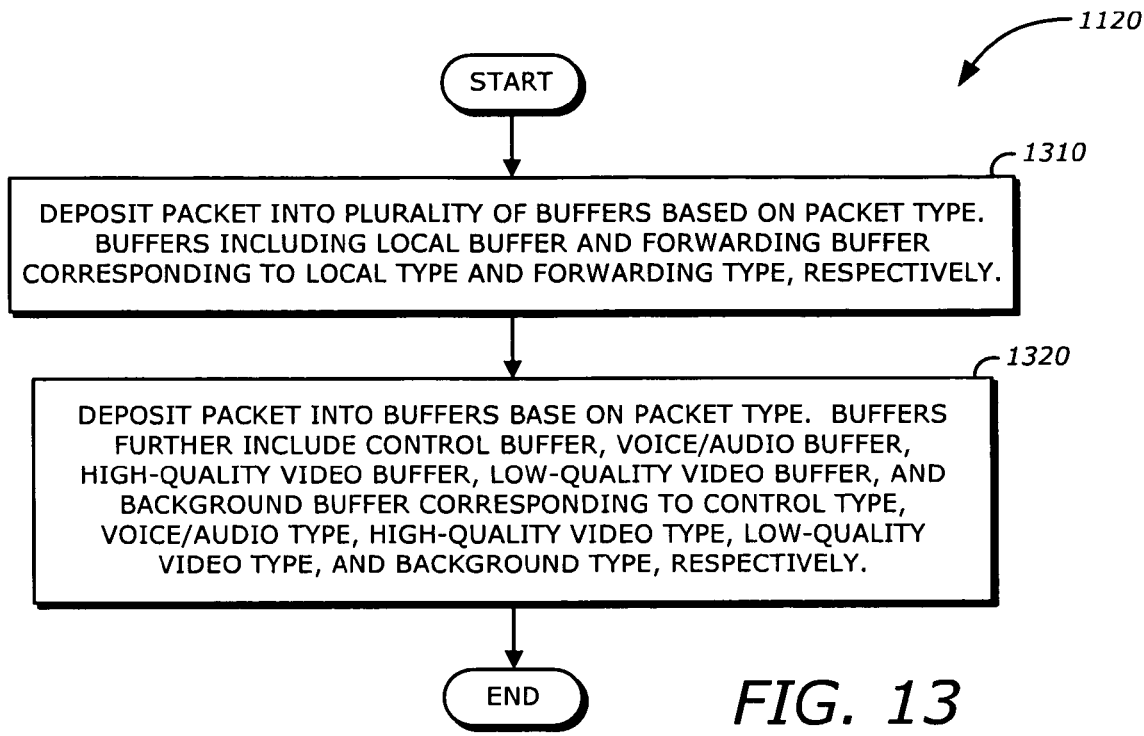
FIG. 13 is a flowchart illustrating a process to enqueue according to one embodiment.

FIG. 13 is a flowchart illustrating the process 1120 shown in FIG. 11 to enqueue according to one embodiment.

Upon START, the process 1120 deposits the packet into the plurality of buffers based on the packet type (Block 1310). The plurality of buffers includes a local buffer and a forwarding buffer corresponding to the local type and the forwarding type, respectively.

Then, the process 1120 deposits the packet into the plurality of buffers based on the further packet type (Block 1320). The plurality of buffers further includes a control buffer, a voice/audio buffer, a high-quality video buffer, a low-quality video buffer, and a background buffer corresponding to the control type, the voice/audio type, the high-quality video type, the low-quality video type, and the background type, respectively. The process 1120 is then terminated.

Figure 14:
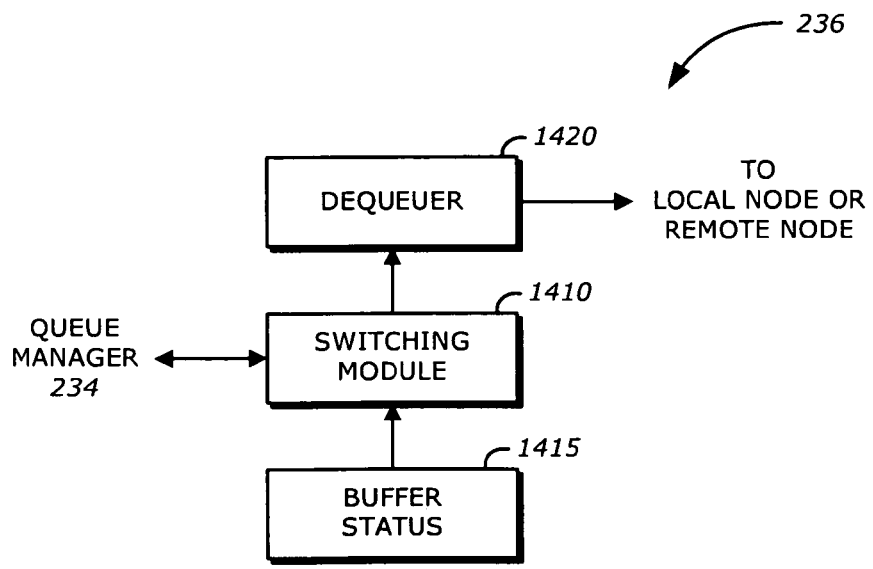
FIG. 14 is a diagram illustrating a scheduler according to one embodiment.

Scheduler:

FIG. 14 is a diagram illustrating the scheduler 236 shown in FIG. 2 according to one embodiment. The scheduler 236 includes a switching module 1410, a buffer status 1415, and a dequeuer 1420. The scheduler 236 may include more or less than the above components.

The switching module 1410 switches to the buffers 1020 in the queue manager 236 to form connections for establishing data paths. The switching module 1410 may be a software switching structure to allow the dequeuer 1420 to access the buffers 1020. It provides visiting the plurality of buffers 1020 in a variable round robin manner. The round robin scheduling is variable in that the quantum time for visiting the buffers and dequeuing may be variable depending on the status of the buffers and their priority level. As described above, the buffers 1020 store packets having packet types associated with priority levels and having buffer types according to the packet types. The packets are transmitted from an application according to a network protocol in a multi-hop mesh network having a local node and a remote node.

The buffer status 1415 provides the status of the buffers. The status of the buffers may indicate the load of the buffers 1020 or the occupancy of the buffers. It may indicate if a buffer is empty. If a buffer is empty, then it may be skipped because there are no packets to retrieve and dequeue.

The dequeuer 1420 dequeues the buffers 1020 according to the buffer types and using an amount dynamically weighted by the priority levels associated with the buffer types. As described above, each buffer is assigned a weight value. This weight value may be used to determine the number, or the amount, of packets to be dequeued. In one embodiment, the weight value of a buffer corresponds to its priority level. The dequeuer 1420 delivers or retrieves a large amount of packets from buffers with higher weight values and delivers or retrieves less number of data packets from buffers that have lower weight values. The overall objective is to reduce or minimize the delay introduced by the scheduler 236 and at the same time ensures priority among the buffers. Furthermore, the dequeuer 1420 ensures that lower priority queues are not starved or do not wait for a long time. The variable round robin traversing procedure prevents starvation.

The amount of packets to be dequeued at each buffer depends on its priority level which is proportional or related to its weight value. For N buffers, suppose the weight values are $W_1, W_2, \ldots, W_N$. At round t, suppose the number of packets in each data buffer is $P_1(t), P_2(t), \ldots, P_N(t)$. Assume a pre-defined bucket with a token size of T. T is the maximum number of packets that the dequeuer 1420 dequeues for each round of visiting the buffers.

Let $S_i(t)=0$ if $P_i(t)=0$ and $S_i(t)=1$ otherwise. (1)

The number, or amount, of packets to be dequeued at buffer j is defined as:

$$Q_j(t) = \min\{P_j(t), (T*W_j*S_j(t))/(\Sigma_{k=0}^{N}(W_k*S_k(t)))\} \quad (2)$$

where min $\{A, B\}=A$ if $A<B$ and min$\{A, B\}=B$ if $B<A$.

As an example, suppose node A sends video packet data and background packet data to node B. Node A enqueues the video packet data to buffer VH 1043 (FIG. 10) and background packet data to buffer BK 1041 (FIG. 10). Suppose buffers VH 1043 and BK 1041 are assigned weights 3 and 1, respectively. Assume that T=8 and the numbers of packets stored in buffers VH 1043 and BK 1041 are $P_{VH}=18$ and $P_{BK}=5$, respectively. Assume that the remaining buffers are empty. Using equations (1) and (2) above, the numbers of packets to be dequeued at buffers VH 1043 and BK 1041 are:

$Q_{VH}=\text{Min}\{18, 8*3/(3+1)\}=\text{Min}\{18,6\}=6$ $Q_{BK}=\text{Min}\{5, 8*1/(3+1)\}=\text{Min}\{5,2\}=2$.

Figure 15:
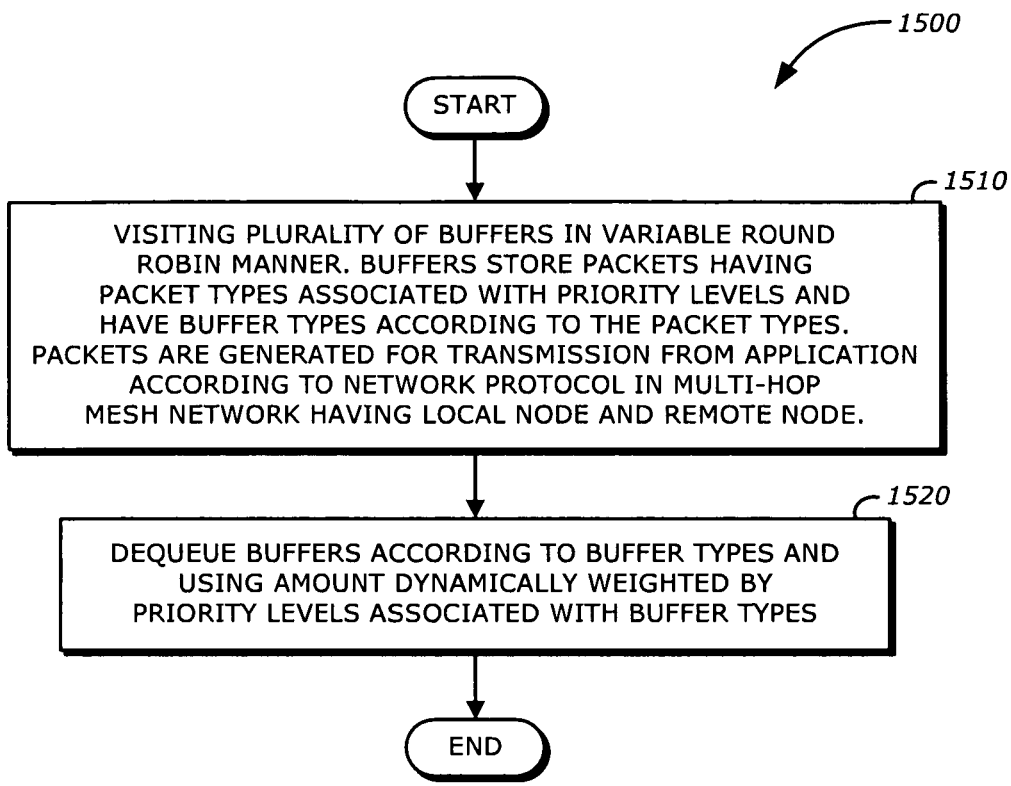
FIG. 15 is a flowchart illustrating a process to schedule according to one embodiment.

FIG. 15 is a flowchart illustrating a process 1500 to schedule according to one embodiment.

Upon START, the process 1500 visits a plurality of buffers in a variable round robin manner (Block 1510). The buffers store packets having packet types associated with priority levels and having buffer types according to the packet types. The packets are generated for transmission from an application according to a network protocol in a multi-hop mesh network having a local node and a remote node. Next, the process 1500 dequeues the buffers according to the buffer types and using an amount dynamically weighted by the priority levels associated with the buffer types (Block 1520). The process 1500 is then terminated.

Figure 16:
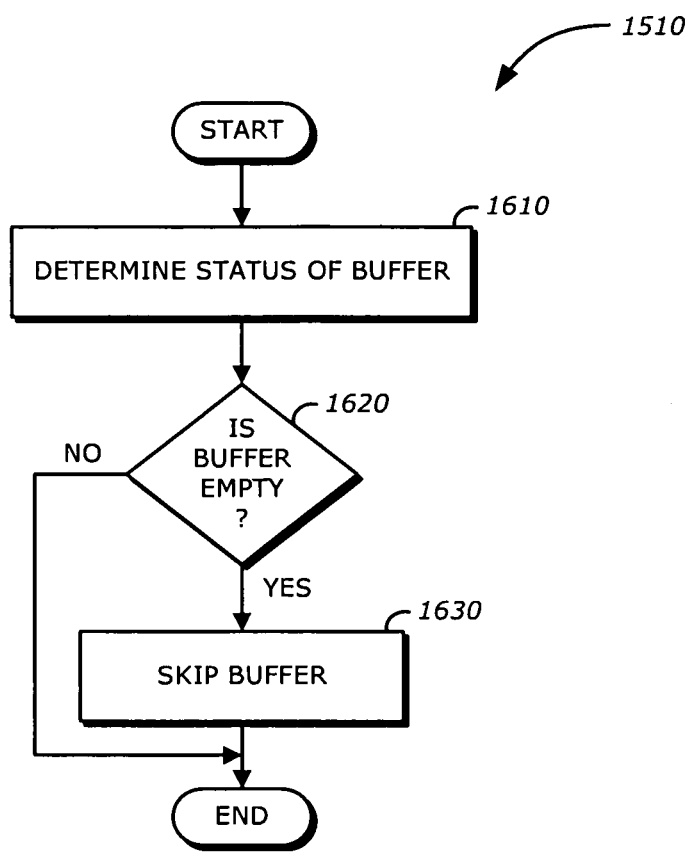
FIG. 16 is a flowchart illustrating a process to visit the buffers according to one embodiment.

FIG. 16 is a flowchart illustrating the process 1510 to visit the buffers according to one embodiment.

Upon START, the process 1510 determines the status of the buffer (Block 1610). Next, the process 1510 determines if the buffer is empty (Block 1620). If not, the process 1510 is terminated. Otherwise, the process 1510 skips the buffer (Block 1630) and is then terminated. It is contemplated that the process 1510 is repeated for all the buffers in the queue manager according to the variable round robin scheduling.

Figure 17:
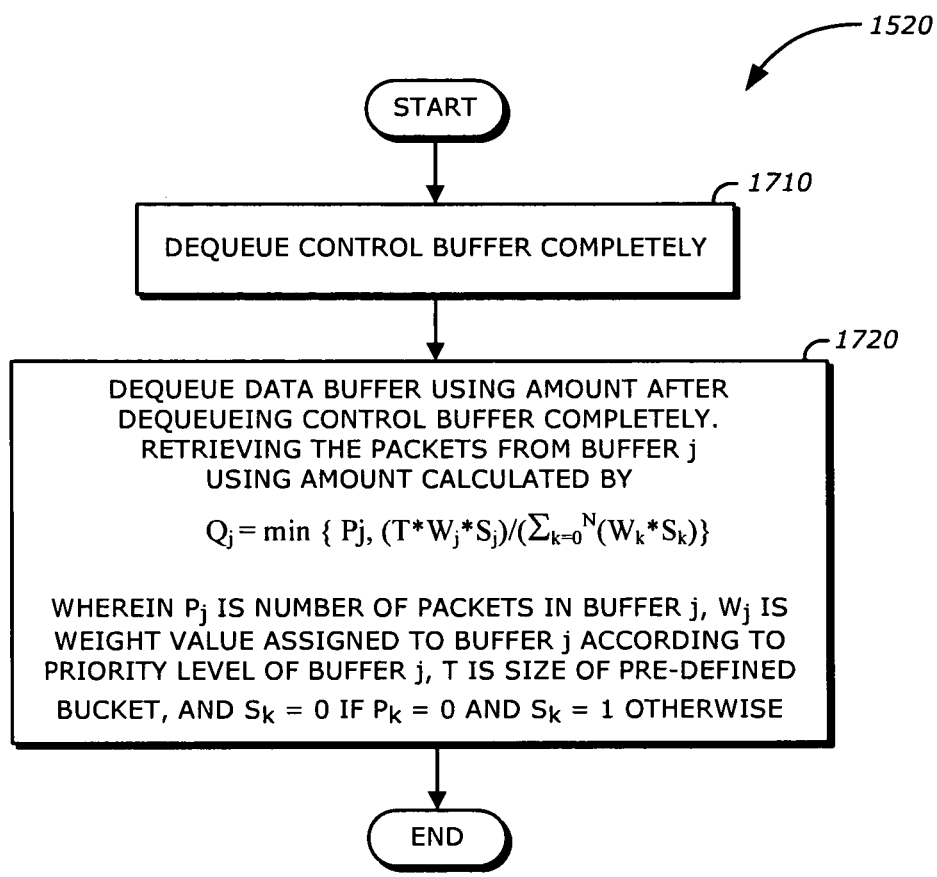
FIG. 17 is a flowchart illustrating the process 1520 to dequeue the buffers according to one embodiment.

FIG. 17 is a flowchart illustrating the process 1520 to dequeue the buffers according to one embodiment.

Upon START, the process 1520 dequeues a control buffer completely (Block 1710). As discussed above, the control buffer has the highest priority because the packets in the control buffer are critical to maintain the mesh network operations. Furthermore, control packets are usually small in size and queued less frequently than data packets, typically at a constant rate. Next, the process 1520 dequeues a data buffer after dequeuing the control buffer completely (Block 1720). The process 1520 dequeues the data buffers using an amount that is dynamically calculated. In one embodiment, the process 1520 retrieves the packets from a buffer j using the amount calculated by $$Q_j = \min\{Pj, (T*W_j*S_j)/(\Sigma_{k=0}^{N}(W_k*S_k))\}$$

wherein Pj is number of packets in the buffer j, $W_j$ is a weight value assigned to the buffer j according to priority level of the buffer j, T is size of a pre-defined bucket, and $S_k=0$ if $P_k=0$ and $S_k=1$ otherwise.

Figure 18:
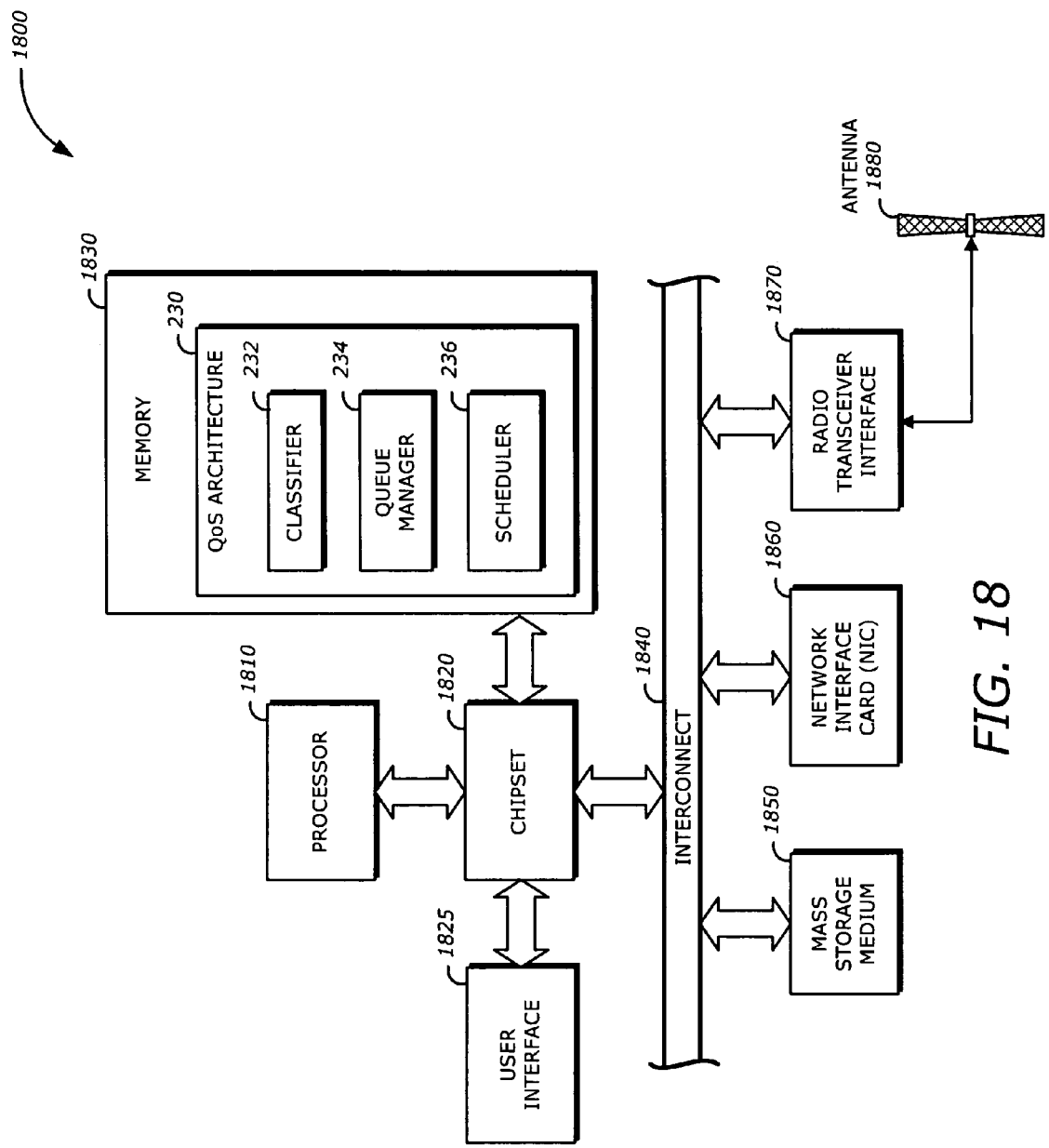
FIG. 18 is a diagram illustrating a processing system to perform the QoS according to one embodiment.

FIG. 18 is a diagram illustrating a processing system 1800 to perform the QoS according to one embodiment. The processing system 1800 may be a tier-2 or tier-3 device in the WHMN. It may include a processor 1810, a chips set 1820, a user interface 1825, a memory 1830, an interconnect 1840, a mass storage medium 1850, a network interface card 1860, a radio transceiver interface 1870, and an antenna 1880. The processing system 1800 may include more or less than the above components.

The processor 1810 may be a central processing unit of any type of architecture, such as processors using hyper threading, security, network, digital media technologies, single-core processors, multi-core processors, embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture.

The chipset 1820 provides control and configuration of memory and input/output (I/O) devices such as the memory 1830, the user interface 1825, the mass storage medium 1850, and the network interface card 1860, and the radio transceiver 1870. The chipset 1820 may integrate multiple functionalities such as I/O controls, graphics, media, host-to-peripheral bus interface, memory control, power management, etc.

The user interface 1825 may include circuits and functionalities that provides interface to a user. This may include display control, entry device control, remote control, etc. The entry device or devices may include keyboard, mouse, trackball, pointing device, stylus, or any other appropriate entry device. The display device may be a television (TV) set, a display monitor, or a graphic output device. The display type may include any display type such as high definition TV (HDTV), cathode ray tube (CRT), flat panel display, plasma, liquid crystal display (LCD), etc.

The memory 1830 stores system code and data. The memory 1830 is typically implemented with dynamic random access memory (DRAM), static random access memory (SRAM), or any other types of memories including those that do not need to be refreshed, including read only memory (ROM), flash memories. In one embodiment, the memory 1830 may contain a QoS architecture 230 which may include the classifier 232, the queue manager 234, and the scheduler 236. For simplicity, the QoS architecture 230 is shown as part of the memory 1830. It may be downloaded, copied, or transferred from the mass storage medium 1850. It is contemplated that the QoS architecture 230, or any of its components may be implemented by hardware, software, firmware, or any combination thereof.

The interconnect 1840 provides an interface for the chipset 1820 to communicate with peripheral devices such as the mass storage medium 1850 and the NIC 1860. The interconnect 1840 may be point-to-point or connected to multiple devices. For clarity, not all the interconnects are shown. It is contemplated that the interconnect 1840 may include any interconnect or bus such as Peripheral Component Interconnect (PCI), PCI Express, Universal Serial Bus (USB), and Direct Media Interface (DMI), etc. The mass storage medium 1850 may include compact disk (CD) read-only memory (ROM), memory stick, memory card, smart card, digital video/versatile disc (DVD), floppy drive, hard drive, tape drive, and any other electronic, magnetic or optic storage devices. The mass storage device provides a mechanism to read machine-accessible media. The NIC 1860 provides interface to the various network layers in the WHMN such as the TCP/IP layer 220 and the MAC layer 240 as shown in FIG. 2.

The radio transceiver interface 1870 may include analog and digital circuits to perform radio communication interface. It is connected to the antenna 1880 to receive and transmit radio frequency (RF) signals. It may include analog and digital circuitries for down-conversion, filtering, analog-to-digital conversion, digital-to-analog conversion, up-conversion, wireless LAN interface, frequency multiplexing, etc. The antenna 1880 may be any appropriate RF antenna for wireless communication. In one embodiment, the antenna 1880 may be designed to accommodate the frequency ranges as provided by the IEEE 802.11x standards. The frequency range may be tuned to operate from 2.4 GHz to 5 GHz.

Elements of one embodiment may be implemented by hardware, firmware, software or any combination thereof. The term hardware generally refers to an element having a physical structure such as electronic, electromagnetic, optical, electro-optical, mechanical, electromechanical parts, etc. A hardware implementation may include analog or digital circuits, devices, processors, applications specific integrated circuits (ASICs), programmable logic devices (PLDs), field programmable gate arrays (FPGAs), or any electronic devices. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc., that is implemented or embodied in a hardware structure (e.g., flash memory). Examples of firmware may include microcode, writable control store, micro-programmed structure. When implemented in software or firmware, the elements of an embodiment may be the code segments to perform the necessary tasks. The software/firmware may include the actual code to carry out the operations described in one embodiment, or code that emulates or simulates the operations. The program or code segments may be stored in a processor or machine accessible medium. The "processor readable or accessible medium" or "machine readable or accessible medium" may include any medium that may store or transfer information. Examples of the processor readable or machine accessible medium that may store include a storage medium, an electronic circuit, a semiconductor memory device, a read only memory (ROM), a flash memory, an erasable programmable ROM (EPROM), a floppy diskette, a compact disk (CD) ROM, an optical storage medium, a magnetic storage medium, a memory stick, a memory card, a hard disk, etc. The machine accessible medium may be embodied in an article of manufacture. The machine accessible medium may include information or data that, when accessed by a machine, cause the machine to perform the operations or actions described above. The machine accessible medium may also include program code, instruction or instructions embedded therein. The program code may include machine readable code, instruction or instructions to perform the operations or actions described above. The term "information" or "data" here refers to any type of information that is encoded for machine-readable purposes. Therefore, it may include program, code, data, file, etc.

All or part of an embodiment may be implemented by various means depending on applications according to particular features, functions. These means may include hardware, software, or firmware, or any combination thereof. A hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method comprising:
    extracting a port identifier in a transport layer header of a packet having a packet type associated with a priority level, the packet being transmitted from or to an application according to a network protocol in a multi-hop mesh network having a local node and a remote node, the port identifier including a port number; and
    classifying the packet into the packet type using the port identifier and one of a pre-defined port list, a dynamic port table, and an application header of the application,
    wherein classifying comprises:
        if the port identifier belongs to the pre-defined port list, classifying the packet to the packet type associated with the port identifier in the pre-defined port list, and if the port identifier does not belong to the pre-defined port list, searching the dynamic port table for the port identifier,
        if the dynamic port table contains the port identifier, classifying the packet into the packet type associated with the port identifier in the dynamic port table, and if the dynamic port table does not contain the port identifier, analyzing the application header to identify the packet type,
        classifying the packet into the packet type identified from the application header, and
        updating the dynamic port table to include the port identifier.

2. The method of claim 1 wherein analyzing the application header comprises:
    capturing a control packet belonging to a current application session to identify a session type or a streaming type; and
    recognizing the network protocol.

3. The method of claim 1 wherein updating the dynamic port table comprises:
    associating the priority level to the port identifier; and
    removing the port identifier from the dynamic port table when a connection of the application session is closed.

4. An article of manufacture comprising:
    a machine-accessible storage medium including data that, when accessed by a machine, cause the machine to perform operations comprising:
    extracting a port identifier in a transport layer header of a packet having a packet type associated with a priority level, the packet being transmitted from or to an application according to a network protocol in a multi-hop mesh network having a local node and a remote node, the port identifier including a port number; and
    classifying the packet into the packet type using the port identifier and one of a pre-defined port list, a dynamic port table, and an application header of the application,
    wherein classifying comprises:
        if the port identifier belongs to the pre-defined port list, classifying the packet to the packet type associated with the port identifier in the pre-defined port list, and if the port identifier does not belong to the pre-defined port list, searching the dynamic port table for the port identifier,
        if the dynamic port table contains the port identifier, classifying the packet into the packet type associated with the port identifier in the dynamic port table, and if the dynamic port table does not contain the port identifier, analyzing the application header to identify the packet type,
        classifying the packet into the packet type identified from the application header, and updating the dynamic port table to include the port identifier.

5. The article of manufacture of claim 4 wherein the data causing the machine to perform analyzing the application header comprise data that, when accessed by the machine, cause the machine to perform operations comprising:
   capturing a control packet belonging to a current application session to identify a session type or a streaming type; and
   recognizing the network protocol.

6. The article of manufacture of claim 4 wherein the data causing the machine to perform updating the dynamic port table comprise data that, when accessed by the machine, cause the machine to perform operations comprising:
   associating the priority level to the port identifier; and
   removing the port identifier from the dynamic port table when a connection of the application session is closed.

7. An apparatus comprising:
   an extractor to extract a port identifier in a transport layer header of a packet having a packet type associated with a priority level, the packet being transmitted from or to an application according to a network protocol in a multi-hop mesh network having a local node and a remote node, the port identifier including a port number; and
   a packet classifier coupled to the extractor to classify the packet into the packet type using the port identifier and one of a pre-defined port list, a dynamic port table, and an application header of the application,
   wherein the packet classifier comprises:
      the pre-defined port list wherein if the port identifier belongs to the pre-defined port list, the packet is classified to the packet type associated with the port identifier in the pre-defined port list,
      the dynamic port table wherein if the port identifier does not belong to the pre-defined port list and the dynamic port table contains the port identifier, the packet is classified into the packet type associated with the port identifier in the dynamic port table,
      an analyzer to analyze the application header to identify the packet type, and wherein if the port identifier does not belong to the pre-defined port list and the dynamic port table does not contain the port identifier, the packet is classified into the packet type identified from the application header, and
      an updater to update the dynamic port table to include the port identifier.

8. The apparatus of claim 7 wherein the analyzer captures a control packet belonging to a current application session to identify a session type or a streaming type, and recognizes the network protocol.

9. The apparatus of claim 7 wherein the updater associates the priority level to the port identifier, and removes the port identifier from the dynamic port table when a connection of the application session is closed.

* * * * *